(12) United States Patent
Berg et al.

(10) Patent No.: US 7,185,071 B2
(45) Date of Patent: Feb. 27, 2007

(54) SELF-HEALING VERSION AND CONFIGURATION MODEL FOR AN APPLICATION SERVER

(75) Inventors: Daniel C. Berg, Cary, NC (US); Lawrence S. Rich, Cary, NC (US); Ritchard L. Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 10/328,874

(22) Filed: Dec. 24, 2002

(65) Prior Publication Data

US 2004/0123285 A1    Jun. 24, 2004

(51) Int. Cl.
- G06F 15/177 (2006.01)
- G06F 9/445 (2006.01)
- G06F 11/00 (2006.01)
- G06F 9/44 (2006.01)

(52) U.S. Cl. ............... 709/220; 717/176; 717/170; 717/171; 714/2

(58) Field of Classification Search .......... None
See application file for complete search history.

(56) References Cited

U.S. PATENT DOCUMENTS

| | | | |
|---|---|---|---|
| 6,298,478 B1 * | 10/2001 | Nally et al. | 717/170 |
| 2003/0023707 A1 * | 1/2003 | Ryan | 709/220 |
| 2003/0084425 A1 * | 5/2003 | Glaser | 717/110 |
| 2003/0093501 A1 * | 5/2003 | Carlson et al. | 709/220 |
| 2003/0192031 A1 * | 10/2003 | Srinivasan et al. | 717/120 |

OTHER PUBLICATIONS

The Orion Team, Remote Access, Feb. 2002, published on the Atlassian Knowledge Base, http://web.archive.org/web/20020215021426/kb.atlassian.com/content/orion.docs/remote-access/remote-access.html.*

Tim deBoer, Developing J2EE Utility JARs in WebSphere Studio Application Developer, Dec. 2001, WebSphere Studio Development Team, IBM Toronto Lab.*

Bea, SilverStream eXtend Composer Enterprise Server Guide for the BEA Weblogic Application Server, Jul. 2002, Version 4.0.*

Swierk et al., The Roma personal metadata service, 2000, Third IEEE Workshop on Mobile Computing Systems and Applications (WMCSA'00), http://www.mosquitonet.stanford.edu/publications/Roma-WMCSA2000.pdf.*

Lagoze, The Warwick Framework, A Container Architecture for Diverse Sets of Metadata, Jul. 1996, D-Lib Magazine, ISSN 1082-9873, http://www.dlib.org/dlib/july96/lagoze/07lagoze.html.*

* cited by examiner

*Primary Examiner*—Hoang-Vu Antony Nguyen-Ba
(74) *Attorney, Agent, or Firm*—Synnestvedt & Lechner LLP; Martin McKinley (57) ABSTRACT

Application configurations, including applications themselves, application components, and modules associated with the application are installed on an application-server machine and stored in system-determined locations. These locations, or absolute paths, are then stored in a "loose configuration". As new versions of applications, components, and/or modules are installed, they are placed in unique locations and given unique version numbers. A record of each application configuration version is stored and is referred to as "snapshots". These snapshots provide a record of and pointers to the various elements that make up the various application configuration versions, so that at any time, a current version of an application configuration can be "rolled back" to a previous version of an application configuration. The methodology can be utilized to provide a self-healing configuration, whereby a faulty version of an application configuration can be rolled back to a previous version automatically.

9 Claims, 6 Drawing Sheets

SELF-HEALING VERSION AND CONFIGURATION MODEL FOR AN APPLICATION SERVER

BACKGROUND OF THE INVENTION

1. Field of the Invention

The present invention relates to the field of computer system interfaces and, more particularly, to the installation, versioning, and execution of applications on an application server.

2. Description of the Related Art

As is well known, computer files are stored in a storage medium (e.g., disk) using a directory structure. The "address" of a file is the storage location from where it can be retrieved and typically comprises one or more directory segments and a file name. This address is referred to as the "absolute path" of the file. As an example, in a Windows environment, the absolute path "D:\Workspace\Projects\ExampleApplication v01" identifies a file with the filename "ExampleApplication v01" stored on the "D drive" of a Windows-based computer in the subdirectory "Projects" of the directory "Workspace".

The Java 2 Platform Enterprise Edition (J2EE) specification defines a standard architecture that has received widespread industry support and growing customer acceptance, and increased investment focus has been placed on J2EE technology by the industry. In accordance with the Sun J2EE specification, an enterprise application is packaged in a well known archive file format, and the packaged application is called an Enterprise Archive, or EAR file. A typical J2EE application comprises multiple archive files, referred to as "modules" and "utility JARs." These archives may also be known as "nested" archives. When an enterprise application is deployed on an application server, it is common for the top level EAR file to be expanded into a directory structure on disk. The nested archives in the expanded EAR file are then located as files or directories directly under the root directory location of the EAR file.

A module in the context of J2EE architecture is a specialized kind of JAR file, containing Java classes and a deployment descriptor. A deployment descriptor is a configuration file that contains deployment information instructing an application server running the program how to deploy the enterprise application. A utility JAR file is a common JAR file that contains compiled Java classes that are referenced by Java classes in one or more other module or JAR files in the enterprise application. As noted above, all modules and utility JARs are relative to the EAR file that contains them.

It is not uncommon for the nested JAR files to themselves contain nested JAR files. An example is a WAR file as described in the Sun Java Servlet Specification, v2.2, by Sun Microsystems (Dec. 17, 1999). In addition to web pages and other assorted files (e.g., graphics), a WAR file may contain "libraries", which are JAR files containing compiled programming code to be utilized by the web application.

With software in general, and in particular, in J2EE architecture, software applications, modules, and JARs are continually being modified, upgraded, corrected, and enhanced. Sometimes these changes are major and visible to the user and other times the changes are minor and/or affect "behind the scenes" activity with respect to the program, module, etc. Sometimes the modification of a program or module can cause errors in the overall program in its operation. In addition, sometimes the changes turn out to be less than desirable for the user.

Typically, software is given "version numbers" to indicate the particular version of a software element. Thus, for example, in the above example, the program "ExampleApplication v01" may be modified, creating "ExampleApplication v01.1" or "ExampleApplication v02". Typically, when new versions of programs are installed, they overwrite the existing version. Thus, for example, when a user of ExampleApplication v01 upgrades the software to ExampleApplication v02, the user no longer has access to the version v01.

If all software worked properly, and all upgrades were desirable by users, the overwriting of an old version would not present a significant problem. However, in reality, it is quite common for software to experience bugs due to, for example, the operating system upon which it is running, the hardware on which it is installed, and other similar issues. Thus, situations often arise where a user would like to revert back to a previous version of a program or module within a program. However, due to the above-described overwriting of the earlier version, this typically requires the user to locate the old version, typically stored on a LAN file system or in a code repository, reinstall the old version, and thereby lose the new version.

Other situations may arise where a user wishes to use one version (e.g., ExampleApplication v01) for one particular process and use a different version (ExampleApplication v02) for a different process. However, given the overwriting process described above, this is not possible. Ad hoc solutions to this problem do exist. For example, a user may install a new version of software in a separate directory or store it in a separate storage location. This requires that the user recall where it is stored and find the other desired version when necessary. The problem is magnified when it is considered that application servers are designed to run web-based programs that serve very large numbers of users, and "down time" must be kept to a minimum. Therefore, updates to modules in an application, and rollbacks when such updates are determined to have caused problems, must be done in such a way as to minimize the impact to the running programs.

A solution developed for use with Websphere by IBM involves the concept of "loose files", also known as "loose modules" or "loose archives." This solution is described in detail in commonly-assigned, copending U.S. application Ser. No. 10/284,633, filed on Oct. 31, 2002, the disclosure of which is incorporated fully herein by reference. Loose files are simply files that are stored outside of the directory structure of the expanded EAR, i.e., they are not contained in a subdirectory of the EAR. For example, an EAR might contain a module named "myEJBs.jar". Normally, "myEJBs.jar" would be a file located directly in the directory of the expanded EAR. In this solution, however, rather than store the nested archive contents within the file structure of the EAR file, contents are placed in separate locations in another directory. This enables the application server to piece together an application from separately located modules and JARs spread across the file system.

To coordinate the interaction between directories making up an enterprise application and mapping the loose files for use at runtime, this solution utilizes the above-described file structure and a "loose configuration file" to store the absolute paths of the nested archives.

This implementation is still limited, however, in that only one version of an application, or of a module contained by an application, can exist on the application server at any one time. What is needed is an implementation, using the aforementioned loose configuration, which allows multiple versions of applications and the modules contained therein to coexist on the same machine, and to allow the server to seamlessly update, rollback, start, and restart said components.

SUMMARY OF THE INVENTION

In accordance with the present invention, application configurations, including applications themselves, application components, and modules associated with the application are installed on an application-server machine and stored in system-determined locations.

These locations, or absolute paths are then stored in a "loose configuration" i.e., they are stored in a file, the location of which is outside of all the installed applications. Within the loose configuration, each application, component, and/or module is associated with a unique version number that associates it with its absolute path. As new versions of applications, components, and/or modules are installed, they are placed in unique locations and given unique version numbers.

A record of each application configuration version are stored and are referred to as "snapshots". These snapshots provide a record of and pointers to the various elements that make up the various application configuration versions, so that at any time, a current version of an application configuration can be "rolled back" to a previous version of an application configuration. Rather than overwrite the previous application configurations, they are all available unless they experience a failure, in which case they are marked as unavailable. All snapshots are stored within the loose configuration. Both the application configurations (and the elements that make them up) as well as each of the snapshots have a notion of "state", e.g., "Active", "Active Pending", "Available", "Failed", and "Closed". Only one snapshot and application configuration at a time, per application, is considered the active snapshot for the application. It should be noted that the implementation is not limited to the use of a file as a storage mechanism for the loose configuration. For example, an alternative is to store the loose configuration in a relational database.

In a preferred embodiment, the applications are "self-healing", that is, a record is kept of failures of the active application configuration (and its snapshot) and, when a predetermined threshold of failure is reached (e.g., a certain number of failures over a predetermined time period, or failure of a particularly critical module or component), the system automatically rolls back to a previous application configuration version.

DETAILED DESCRIPTION OF THE DRAWINGS

DETAILED DESCRIPTION OF PRESENTLY PREFERRED EMBODIMENTS

Figure 1:
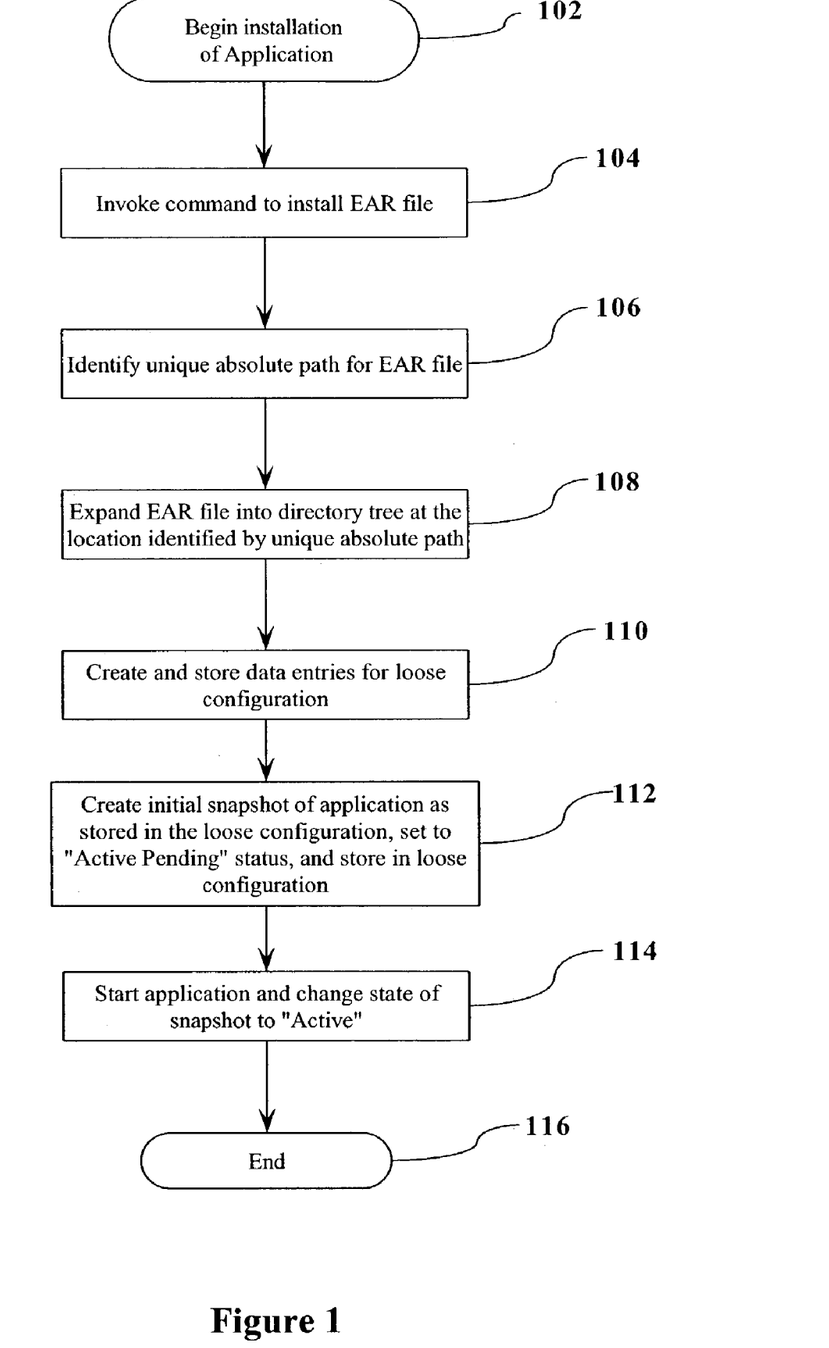
FIG. 1 illustrates the general steps performed by the server during the first installation of an application.

FIG. 1 illustrates the general steps performed by a server during the first installation of an application, pursuant to the present invention. Referring to FIG. 1, at step 102, the installation process is commenced, and at step 104 a command is invoked that causes the server to install an EAR file that contains the various components, modules, etc., that make up the application configuration. At step 106, the system determines (identifies) a unique absolute path into which to expand the EAR file, and at step 108 the system expands the EAR file to a directory tree on disk (or other storage medium) at the location identified by the absolute path.

At step 110, the system creates data entries for the loose configuration. A loose archive and version is created for the application and each nested archive in the application. Each version is associated with the absolute path of the archive, and these initial versions are stored in the loose configuration.

At step 112, the system creates an initial snapshot of the initial application configuration version. The initial application configuration version is associated with the snapshot; therefore the snapshot contains a record of the versions of components, modules, etc associated with the application at this point in time. The state of the snapshot and the application configuration is set to "Active Pending", meaning that when the server next starts this application, this snapshot (the snapshot in "Active Pending" status) is the snapshot to be used to load the program. The server stores the snapshot information in the loose configuration.

Finally, with the system now set to load the files associated with the snapshot that is in "Active Pending" status, the server starts the application. The application starts, and the server changes the state of the snapshot (now in use) from "Active Pending" to "Active".

Figure 2:
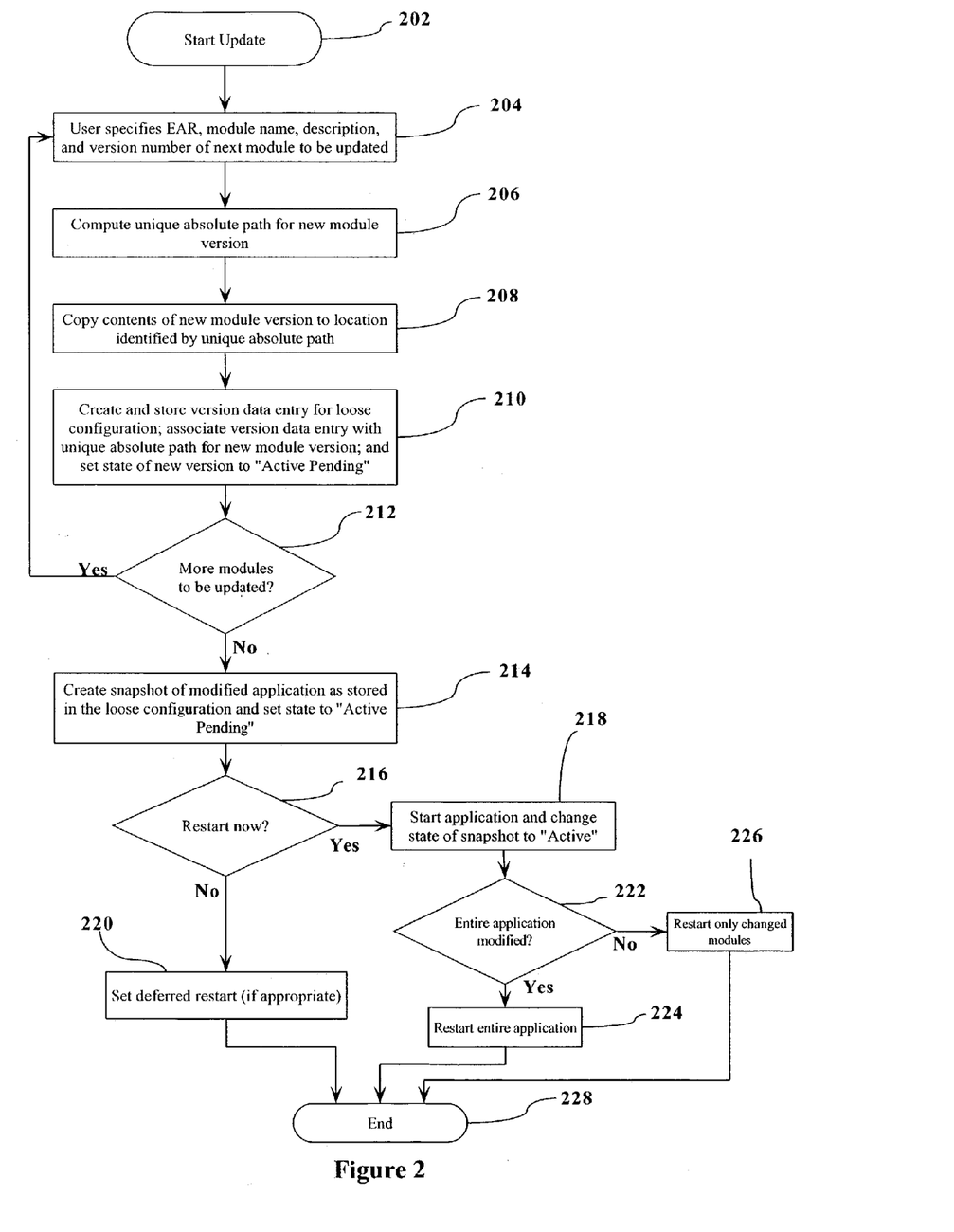
FIG. 2 illustrates the general steps performed by the server when a new version of a module is installed within an existing installed application.

FIG. 2 is a flowchart illustrating the general steps performed by the server when a new version of a module is installed within an existing application, in accordance with the present invention. Referring to FIG. 2, at step 202, a command is issued to start updating modules in the existing application. At step 204 the user specifies the EAR to be updated, the module name within the EAR that is to be updated, and provides an optional description and version name for the new version of the module (e.g., the old name with a new version number). If the new version name is unspecified, the system computes a unique version name.

At step 206, the system computes a unique absolute path for the new module version, and at step 208, copies the contents of the new module version to the location identified by the absolute path. At step 210, the system creates and stores a "version data entry" for the loose archive, to be added to the loose configuration. The version data entry describes various aspects of the loose archive, e.g., its absolute path; which snapshot(s) it is associated with; comments describing its function; its creation date and creator; its state, etc. The version data entry is associated with the unique absolute path for the new module version. The state of the version is then set to "Active Pending".

At step 212, a determination as to whether there are more modules to be updated. If there are, the process proceeds back to step 204, where the same process is carried out for the next module. If, at step 204, it is determined that there are no more modules to be updated, the process proceeds to step 214. At step 214, a snapshot is created for the modified application. Each newly installed module version is associated with the newly-created snapshot, such that the new snapshot now identifies the application containing the newer version(s) of the archive(s). Finally, in step 214 the state of the newly-created snapshot is set to "Active Pending".

At step 216, the application is given a command to start. Optionally, if desired, before the application is actually started (or restarted), a determination can be made as to whether the application should be restarted immediately. In some instances, it may be desired to delay the restarting of the application until a later time. For example, a system administrator might want to install the modules at 4:30 in the afternoon, but queue up a command to defer the restart until the middle of the night when the system is not busy and thus reduce the impact to the daily business activity carried out during normal business hours.

If at step 216 it is determined that the application is not to be immediately restarted, then the process sets the time for a deferred restart (if desired) at step 220, and then the process terminates (step 228). If, however, at step 216 it is determine that an immediate restart is appropriate, then at step 218 the status of the newly-created snapshot is set to "Active" status and then, at step 222, a determination is made as to whether the application itself has been changed, or only one or more nested modules. If at step 222, it is determined that the application itself has been changed, then the process proceeds to step 224, where the entire application is restarted, and then the process terminates at step 228. If at step 222 it is determined that only one or more nested modules have been changed, then at step 226, only the modified modules are restarted, and then at step 228, the process terminates.

Figure 3:
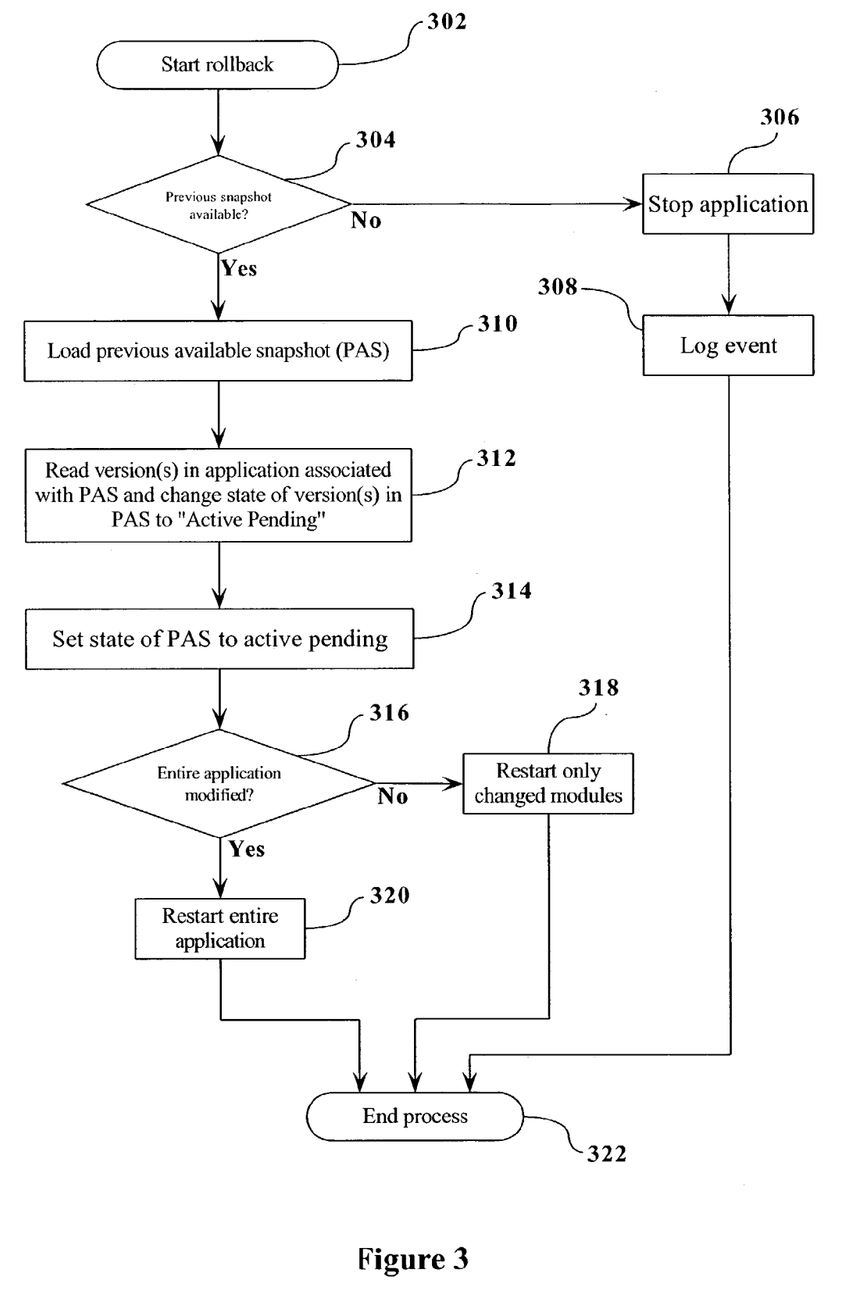
FIG. 3 illustrates the general steps performed by the server when a request is received to rollback an application to a previous snapshot of an application.

FIG. 3 illustrates the general steps performed by a server when a request is received to perform a "rollback" to a previous snapshot of an application. A rollback is simply a return to a previous version (e.g., a more stable version than the version currently in use) as identified in the previous snapshot. This may result from a user invoked system command, or by a self-healing function of the application server. For example, an error threshold can be set for modules in the application. When this threshold is crossed, the server automatically commences the rollback process accordingly.

Referring to FIG. 3, at step 302, a command is issued to rollback the system to a previous version. At step 304, a determination is made as to whether or not a previous snapshot (which would identify the application configuration of a previous version) is available. It is possible that no such snapshot/version exists, either because the current active snapshot/version is the only snapshot/version, or because previous snapshots/versions are in the "failed" state.

If no previously-available snapshot (PAS) exists, the application is stopped (step 306), and, optionally, the event that triggered the rollback is logged (step 308). The event could simply be a command issued by a user to load a different version; alternatively, the event could be the reaching of a threshold failure value (e.g, 10 failures in a 24 hour period). By logging the event, subsequent analysis of versions can be performed more easily. At step 322, the process terminates.

If a PAS does exist, then at step 310, the PAS is loaded is loaded from the loose configuration. The system then, at step 312, reads the version of the application configuration associated with the PAS, and the state of that version is set to "Active Pending". For the currently-active version, the state is set to either "failed" or "available", depending on how the command was initiated. If the command was initiated as a self-healing function because the error threshold was crossed, then the state is set to "failed," thereby identifying this version as being a problem and thus unavailable. Otherwise the state is set to "available" so that, at some time in the future it can be used, if desired.

At step 314, the state of the PAS is set to "Active Pending". Like the versions in the previous step, the state of the currently-active snapshot is changed to either "failed" or "available", depending on how the command was initiated. If the command was initiated as a self-healing function because the error threshold was crossed, then the state is set to "failed." Otherwise the state is set to "available".

At step 316, a determination is made as to whether or not the application itself changed between snapshots, or if only a subset of the modules contained within the snapshot were changed. If the application itself was changed, then at step 320 the entire application is restarted. If, on the other hand, only modules contained within the snapshot were changed, then at step 318, the changed modules only are restarted. Once the application or modules have been restarted, at step 322 the process is terminated.

Figure 4:
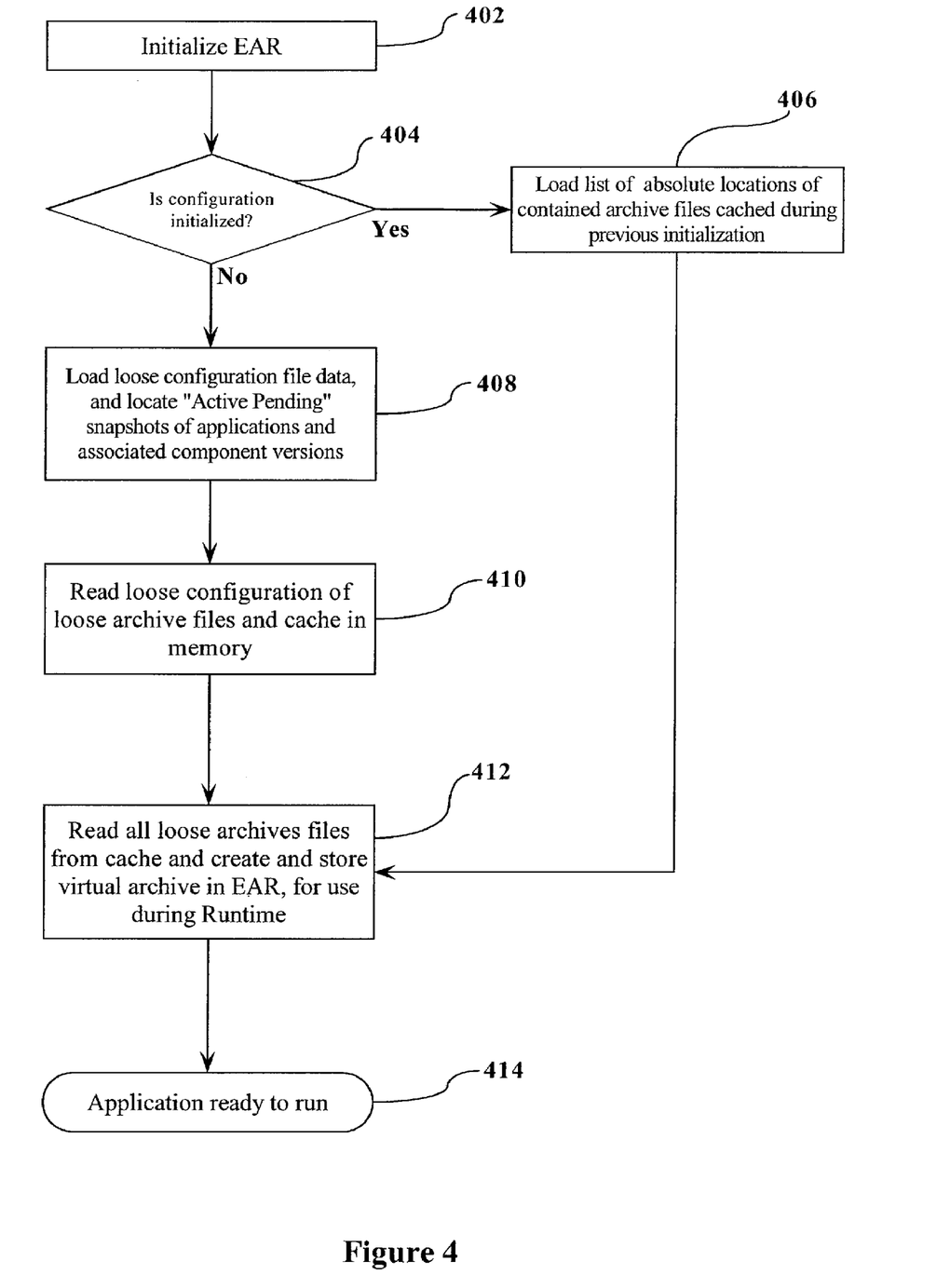
FIG. 4 illustrates an example of steps performed, in accordance with the present invention, when an installed application is initialized by the server.

FIG. 4 illustrates an example of steps performed in accordance with the present invention, when an EAR file (actually the EAR composed by the loose archive versions in a snapshot) is initialized. At step 402, an action is performed to cause the EAR file to initialize in a well known manner. This can comprise, for example, the startup process of the application server.

At step 404 a determination is made as to whether or not the loose configuration has been initialized. This can comprise, for example, reading the configuration from a file on disk or from a database store. If it has been initialized, a list of absolute locations of the nested archive files will already have been cached from the previous startup of an application. The server can run many applications, but there exists one loose configuration file with the snapshots, versions, and absolute paths for all applications. The loose configuration file is actually modeled as a series of objects. Thus, if this is not the first initialization of an application, there will already exist in memory a representation of the loose configuration file with the loose configuration information for all applications. Thus, at step 406, a list is loaded of the absolute location of the nested archive files from the cache and the process then proceeds to step 412.

If at step 404 it is determined that this is the first initialization of an application, the in-memory representation of the loose configuration file must be created. Thus, the server process proceeds to step 408, where the loose configuration file is read to identify the "active pending" snapshot and absolute path information and associated component versions for the nested archive files.

At step 410, the loose configuration is loaded from a file or datastore. The active pending snapshots, with the versions and absolute paths of the nested archive files, are read and cached in RAM. Caching of the data in RAM eliminates the need to reload and reparse the information each time information from the loose configuration file needs to be accessed.

At step 412, all loose archive files are read from the cache and a virtual archive is created and stored in the EAR file of the application configuration identified by the snapshot having the "Active Pending" status. At step 416, the process is finished initializing, and the application and modules are prepared and ready for loading, serving and executing the files contained within.

Figure 5:
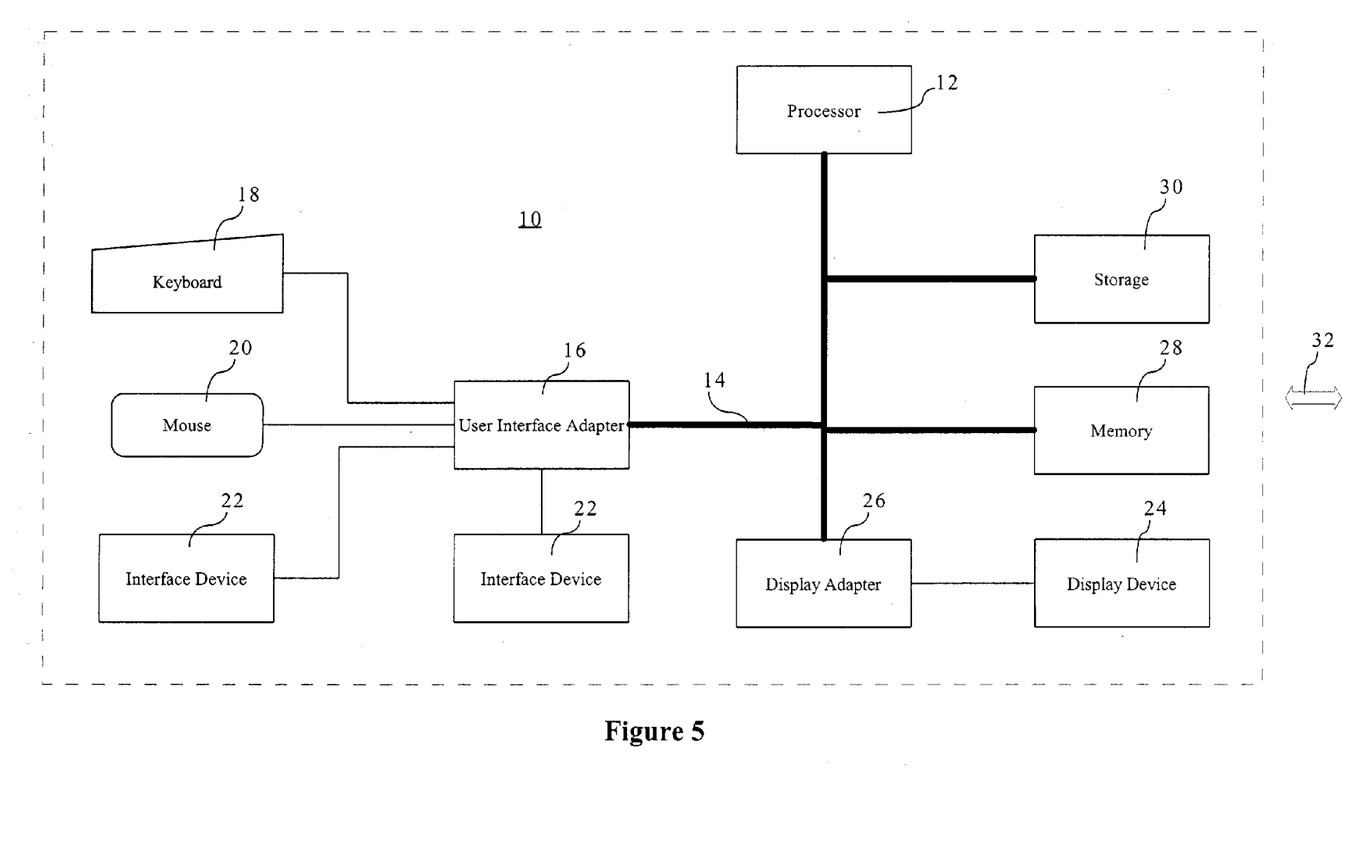
FIG. 5 illustrates a representative workstation hardware environment in which the present invention may be practiced.

FIG. 5 illustrates a representative workstation hardware environment in which the present invention may be practiced. The environment of FIG. 5 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 6:
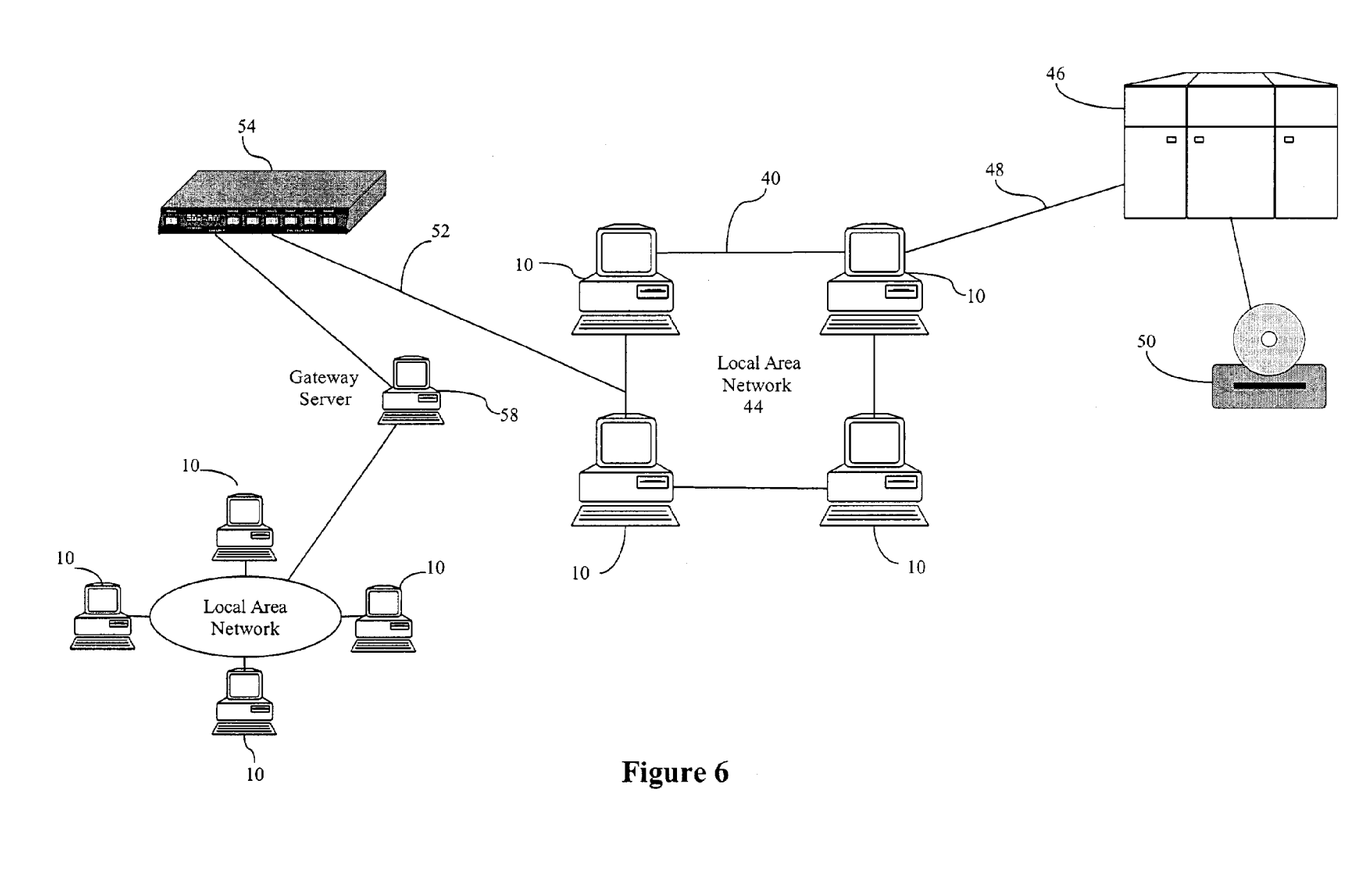
FIG. 6 illustrates a data processing network 40 in which the present invention may be practiced.

FIG. 6 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 6, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied as a computer program product on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The above-described steps can be implemented using standard well-known programming techniques. The novelty of the above-described embodiment lies not in the specific programming techniques but in the use of the steps described to achieve the described results.

To summarize, the server environment will load, serve, and execute the files in the locations specified by the versions in the loose configuration, just as if they were contained in an EAR file or an expanded EAR directory structure, even though the files may be distributed in many disjoint locations on the file system. This method allows multiple versions of applications, and versions of archives within applications, to exist simultaneously on one server machine, and allows the system quickly switch between versions of said applications and components.

In addition, the present invention enables the following, without limitation:

1) the ability to add a new version of an archive without being required to set it's state to active pending, and without being required to include it in a snapshot;

2) the ability to create a new snapshot of any combination of versions, without setting the state of said snapshot to active or active pending;

3) the ability to rollback single module to another version (as opposed to rolling back to an entire previous snapshot), thus creating a new snapshot;

4) the ability to store/record error logs and other status data with a given snapshot;

5) on a restart of an application, the ability to have restarted only those archives that actually have a different version from the previous snapshot;

6) the ability for a user to manually rollback to any snapshot; and 7) the ability to add new modules (by a different name), and remove existing modules from an application, when creating a new version of the application.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method of providing immediate access to multiple configurations of a software application, comprising the steps of:

storing each configuration of said software application on a common application-server in system-determined locations, wherein said storing each configuration comprises:

creating an absolute path for each configuration of said software application; and storing each absolute path in a loose configuration file on said common application server;

creating a snapshot of each configuration;

storing each snapshot in system-determined locations;

setting a state for each configuration and each snapshot; and installing one of said configurations and designating the state of said installed configuration as "active".

2. The method of claim 1, wherein at least two configurations of said software application are stored on said common server, one of which is said designated active configuration and another of which is a previous configuration of said software application, further comprising:

issuing a run command for said active configuration of said software application;

keeping a record of failed attempts to run said active configuration of said software application; and automatically rolling back to a previous configuration of said software application if a failure threshold is met for said active configuration of said software application.

3. The method of claim 2, wherein said multiple configurations of a software application are unique and independent versions of the same software application.

4. A computer program product for providing immediate access to multiple configurations of a software application, the computer program product comprising a computer-readable storage medium having computer-readable program code embodied in the medium, the computer-readable program code comprising:

computer-readable program code that stores each configuration of said software application on a common application-server in system-determined locations, wherein said computer-readable program code that stores each configuration comprises:

computer-readable program code for creating an absolute path for each configuration of said software application; and computer-readable program code for storing each absolute path in a loose configuration file on said common application server;

computer-readable program code that creates a snapshot of each configuration;

computer-readable program code that stores each snapshot in system-determined locations;

computer-readable program code that sets a state for each configuration and each snapshot; and computer-readable program code that installs one of said configurations and designates the state of said installed configuration as "active".

5. The computer program product of claim 4 further comprising:

computer-readable program code for issuing a run command for said active configuration of said software application;

computer-readable program code for keeping a record of failed attempts to run said active configuration of said software application; and computer-readable program code for automatically rolling back to a previous configuration of said software application if a failure threshold is met for said active configuration of said software application.

6. The computer program product of claim 5, wherein said multiple configurations of a software application are unique and independent versions of the same software application.

7. A system for providing immediate access to multiple configurations of a software application stored on a computer-readable medium, comprising:

means for storing each configuration of said software application on a common application-server in system-determined locations, wherein said means for storing each configuration comprises:

means for creating an absolute path for each configuration of said software application; and means for storing each absolute path in a loose configuration file on said common application server;

means for creating a snapshot of each configuration;

means for storing each snapshot in system-determined locations;

means for setting a state for each configuration and each snapshot; and means for installing one of said configurations and designating the state of said installed configuration as "active".

8. The system of claim 7, wherein at least two configurations of said software application are stored on said common server, one of which is said designated active configuration and another of which is a previous configuration of said software application, further comprising:

means for issuing a run command for said active configuration of said software application;

means for keeping a record of failed attempts to run said active configuration of said software application; and means for automatically rolling back to a previous configuration of said software application if a failure threshold is met for said active configuration of said software application.

9. The system of claim 8, wherein said multiple configurations of a software application are unique and independent versions of the same software application.

* * * * *